C. B. Sawyer,
Bread Machine.
No. 92,479. Patented July 13. 1869.
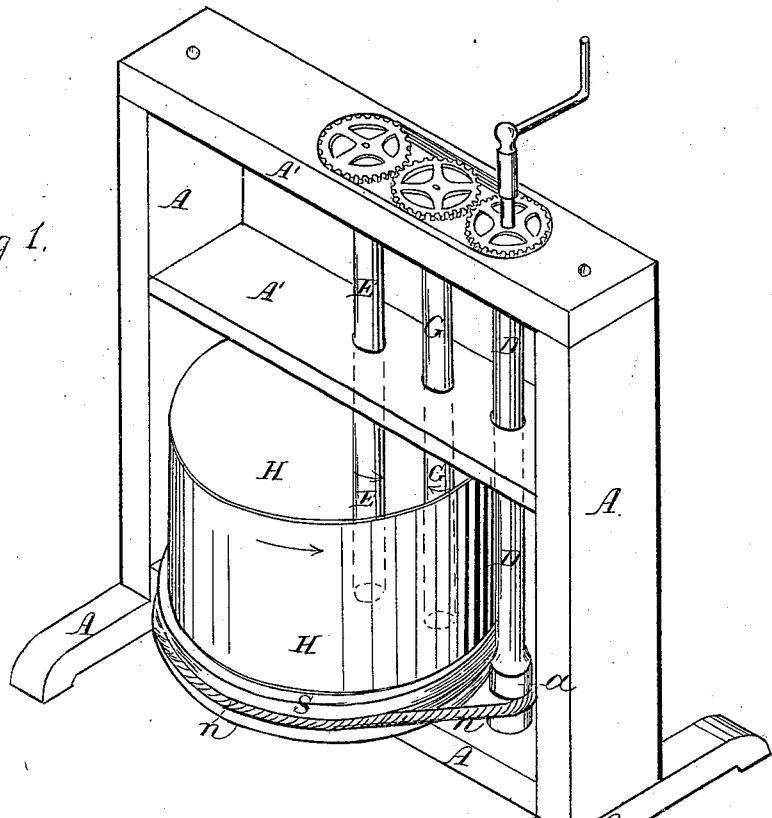
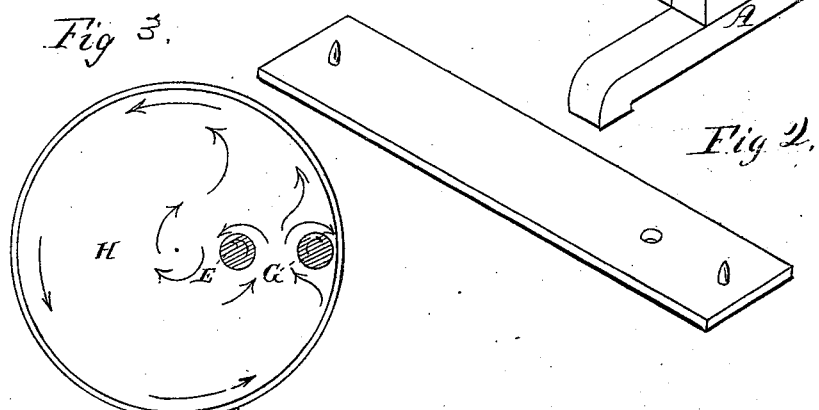
Witnesses.
Edwin Metcalf
Warren R. Perce
Inventor
Charles B. Sawyer

United States Patent Office.

CHARLES B. SAWYER, OF FITCHBURG, MASSACHUSETTS, ASSIGNOR TO HIMSELF AND FRANK G. ALLEN, OF PROVIDENCE, RHODE ISLAND.

Letters Patent No. 92,479, dated July 13, 1869.

IMPROVED DOUGH-KNEADER.

The Schedule referred to in these Letters Patent and making part of the same.

*To all whom it may concern:*

Be it known that I, CHARLES B. SAWYER, of the town of Fitchburg, in the county of Worcester, and State of Massachusetts, have invented a new and useful Improvement in Machines for Kneading Dough for Bread; and I do hereby declare that the following is a full, clear, and exact description of the same, reference being had to the accompanying drawings, making part of this specification, in which—

Figure 1 is a perspective view of a kneading-machine which embodies my improvement.

Figure 2 is a cap-piece for covering the set of gear-wheels at the top of the machine.

My said invention consists of a revolving receptacle for the constituent materials of the dough, and a compound stirrer or kneading-device consisting of two vertical rollers, which, by moving in opposite directions to each other in the receptacle, which also revolves, the bread-material is first thoroughly mingled, and then, by the revolving action mentioned, carried in two currents or moving bodies around the rollers, and are thus thoroughly worked into each other and kneaded to the proper consistency for baking to form bread.

To enable others to make and use my invention, I will proceed to describe the construction and operation of the same.

In the drawing—

A A is an upright frame, within which the moving parts are arranged and operate. These consist of a dish or receptacle H, which may be made of sheet-metal, and is secured on a revolving plate, S, at the bottom, which, by means of one or more grooves and the band *n*, running on its periphery, and upon a pulley, *a*, on the crank-shaft D, revolves the said receptacle in the direction indicated by arrows.

E and G are the stirrers, which are best made of glass or porcelain, in the form of two plain cylinders that extend with their free ends to the bottom of the receptacle, and are supported and revolve in a vertical position in bearings formed in the cross-pieces A' A' of the frame, by motion communicated by the train of gear-wheels from the crank-shaft D; the movement of the said rollers being indicated by the arrows on each; and the said stirrers are arranged relatively with the receptacle, as shown in the plan or diagram of the same exhibited in fig. 3. The stirrer G, being close to the side of the receptacle, revolving in the direction indicated by arrows, the dough is carried around until it meets the rollers E G, the latter, G, of which causes the dough to cleave from the side of the receptacle, and pass between the two rollers, which revolve more rapidly than the receptacle, so that each roller carries the mass of dough next to it in two bodies, as shown by the direction of the arrows, which are repeatedly mingled with and worked into each other, and rapidly kneaded until of the desired consistency, which, for an ordinary batch of bread, for family use, requires from three to five minutes.

Claim.

Having described my invention,

What I claim, and desire to secure by Letters Patent, is—

The improved kneading-machine herein described, consisting of the revolving pan H, the mixers E and G, and the crank-shaft D, with the necessary frame-work and supports, the whole arranged and operating substantially as set forth, for the purposes specified.

C. B. SAWYER.

Witnesses:
D. H. MERRIAM,
ANNIE SAWYER.